T. F. BUCK.
SAFETY FENDER FOR AUTOMOBILES.
APPLICATION FILED SEPT. 30, 1921.

1,404,091.  Patented Jan. 17, 1922.
3 SHEETS—SHEET 1.

Witness
John Milton Jester

Inventor
Thomas F. Buck
By D. A. Gourick
Attorney

T. F. BUCK.
SAFETY FENDER FOR AUTOMOBILES.
APPLICATION FILED SEPT. 30, 1921.

1,404,091.

Patented Jan. 17, 1922.

Witness
John Milton Jester

Inventor
Thomas F. Buck
By D. R. Gourick
Attorney

T. F. BUCK.
SAFETY FENDER FOR AUTOMOBILES.
APPLICATION FILED SEPT. 30, 1921.

1,404,091.

Patented Jan. 17, 1922.

Witness
John Milton Jester

Inventor
Thomas F. Buck
by J. A. Gourick
Attorney

UNITED STATES PATENT OFFICE.

THOMAS F. BUCK, OF NEW CASTLE, PENNSYLVANIA.

SAFETY FENDER FOR AUTOMOBILES.

1,404,091. Specification of Letters Patent. Patented Jan. 17, 1922.

Application filed September 30, 1921. Serial No. 504,408.

*To all whom it may concern:*

Be it known that I, THOMAS F. BUCK, a citizen of the United States, residing at New Castle, in the county of Lawrence and State of Pennsylvania, have invented new and useful Improvements in Safety Fenders for Automobiles, of which the following is a specification.

This invention relates to safety fenders for automobiles and has for its object the provision of a fender or bumper which ordinarily approaches the ground rather closely and which is designed to prevent a person knocked down from being run over by the wheels of the vehicle, means being provided whereby to cushion the shock to a certain extent, this latter feature being of advantage in case of a minor collision as preventing probable destruction of the fender structure.

An important object is the provision of a device of this character which is of the scoop type and which is foldable whereby to be held in raised position, as for instance when traveling over rough or stony roads, it being evident that if the fender were allowed to remain in operative position when passing over rocks and the like, it might be struck and be seriously injured or destroyed.

Another object is the provision of a fender of this character which is built onto the mud guards of the front wheels, the latter being furthermore preferably provided with casings which form the head lamps of the machine.

A further object is the provision of a safety fender which serves to strengthen the mud guards with respect to each other and the frame so as to provide a rigid structure which will prevent any sagging or looseness and consequent rattling of the guards or of the fender itself.

An additional object is the provision of a device of this character which will be comparatively simple and inexpensive in manufacture, easy to install, highly efficient in use, durable in service, and a general improvement in the art.

With the above and other objects and advantages in view, the invention consists in the details of construction to be hereinafter more fully described and claimed and illustrated in the accompanying drawings in which—

Referring more particularly to the drawings, the letter A designates the forward ends of the frame bars of an automobile, B designates the mud guards which extend over the front wheels and which are connected with the running boards D, and E and F designate the radiator and hood, respectively.

Figure 3:
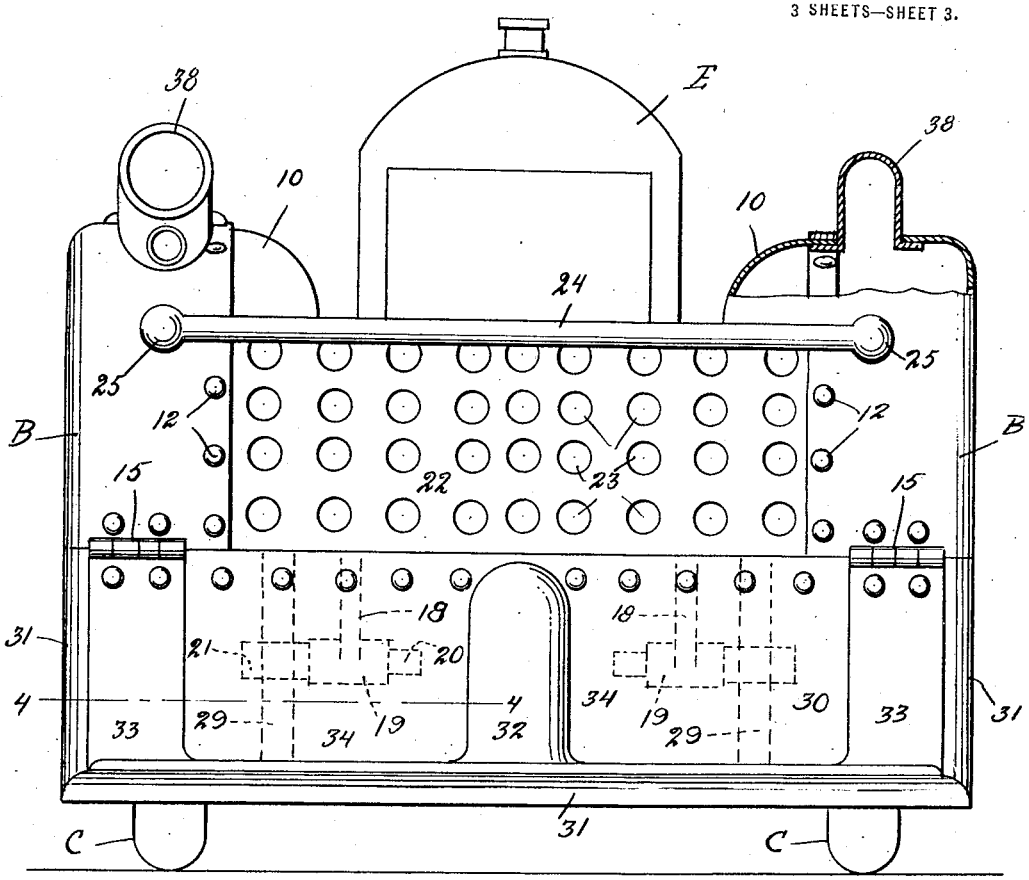
Figure 3 is a front elevation.
Figure 4:
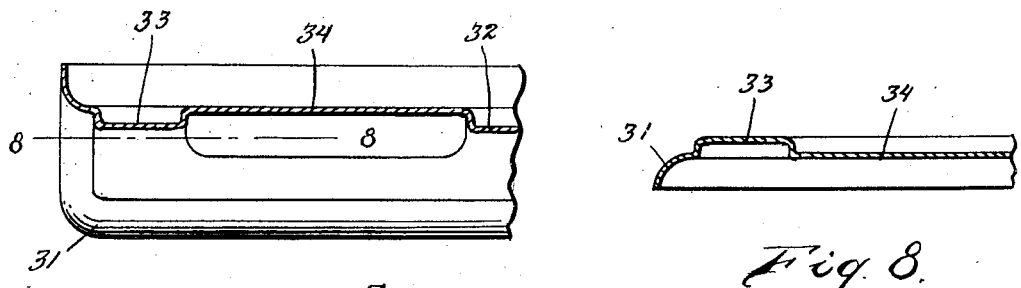
Figure 4 is a section of one end of the movable section taken on the line 4—4 of Figure 3.
Figure 8:
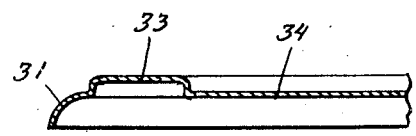
Figure 8 is a detail section on the line 8—8 of Figure 4.

In carrying out my invention I provide a pair of semi-circular shields 10 which are of a somewhat bowl shape and which are formed of suitable material such as sheet steel of proper gage cut and stamped to the desired shape. The members 10 are disposed outwardly of the frame bars A and are secured thereto as by means of suitable rivets 11 or the like. The outer portions of the shield members 10 underlap the inner edges of the mud guards B and are secured thereto as by means of suitable rivets or the like 12. At their forward ends the shield members 10 are formed with cut-out portions 13 for the accommodation of an angle bar 14 which extends transversely across the front of the vehicle and to which are secured the forward ends of the mud guards. The bar 14 extends laterally beyond the shields 10 and has secured thereto, at each end, one leaf of a hinge 15. Formed upon the bars A at the ends thereof, are curved depending arms upon which are pivoted, at 17, other arms 18 which terminate at their lower ends in sleeves 19 through which extend bumper rods 20 provided with rubber buffer sleeves 21. Secured to the outermost peripheral portions of the shields 10 at the front thereof, is a plate 22 which is arcuate in cross section and which extends from one shield to the other, as clearly shown in Figure 3, this plate being provided throughout its area with a plurality of holes 23, which are for the purpose of preventing the cutting off of air to the radiator. I also prefer to use a bumper bar 24 which extends entirely across the front of the device at the upper edge or in a line with the upper edge of the plate 22, and this bumper bar terminates in knobs 25 disposed in advance of the mud guards B. It should also be stated that the shields 10 have associated therewith, at their juncture with the frame bars A, metal strips 26 which are connected at their forward ends with the bar 14 by means of angle pieces 27 suitably riveted in place. All of these above described parts constitute the stationary portion of my fender structure.

Figure 1:
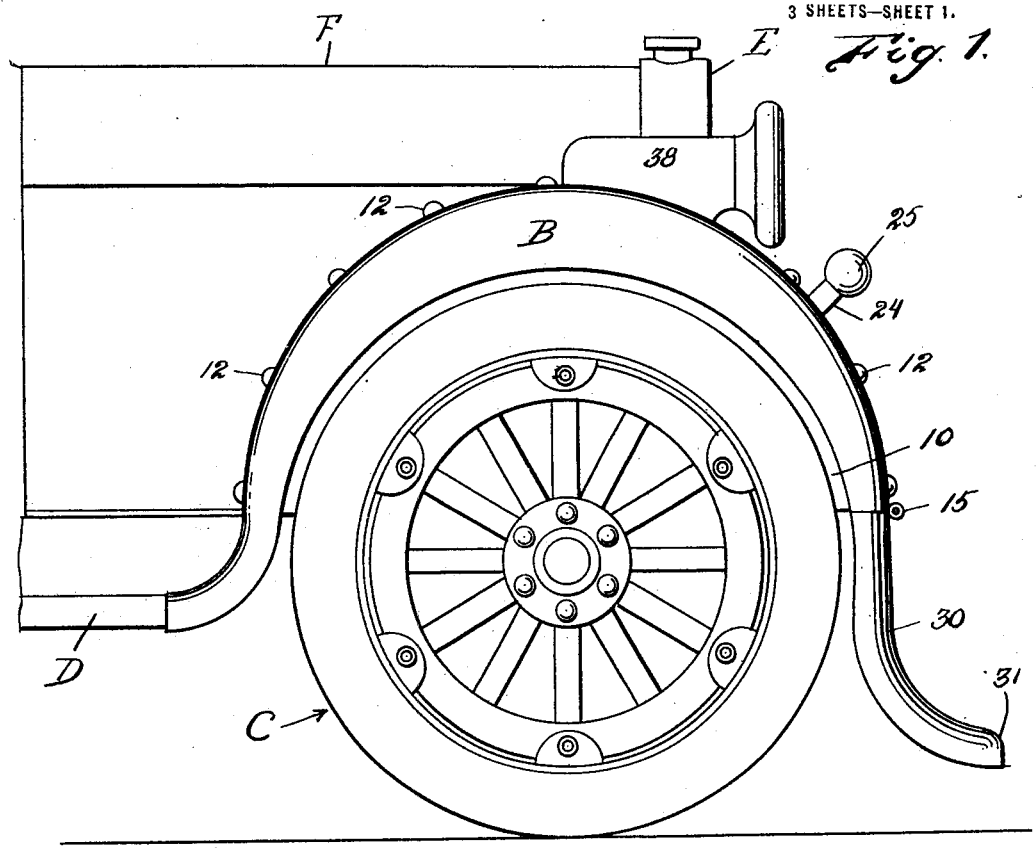
Figure 1 is a side elevation of my device in operative position.
Figures 5, 6:
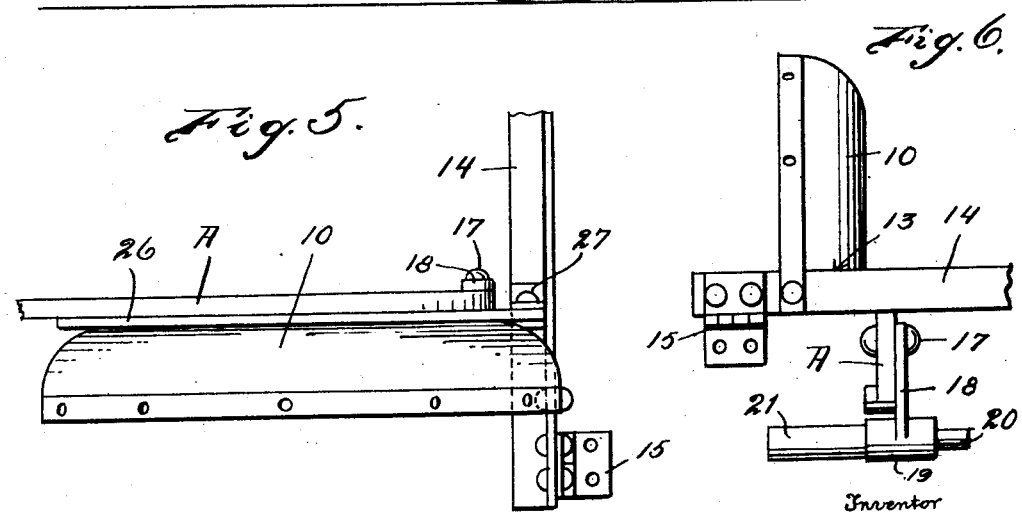
Figure 5 is a plan view of one side of the fender in association with a frame bar of the vehicle.
Figure 6 is a front elevation of the structure shown in Figure 5.
Figure 2:
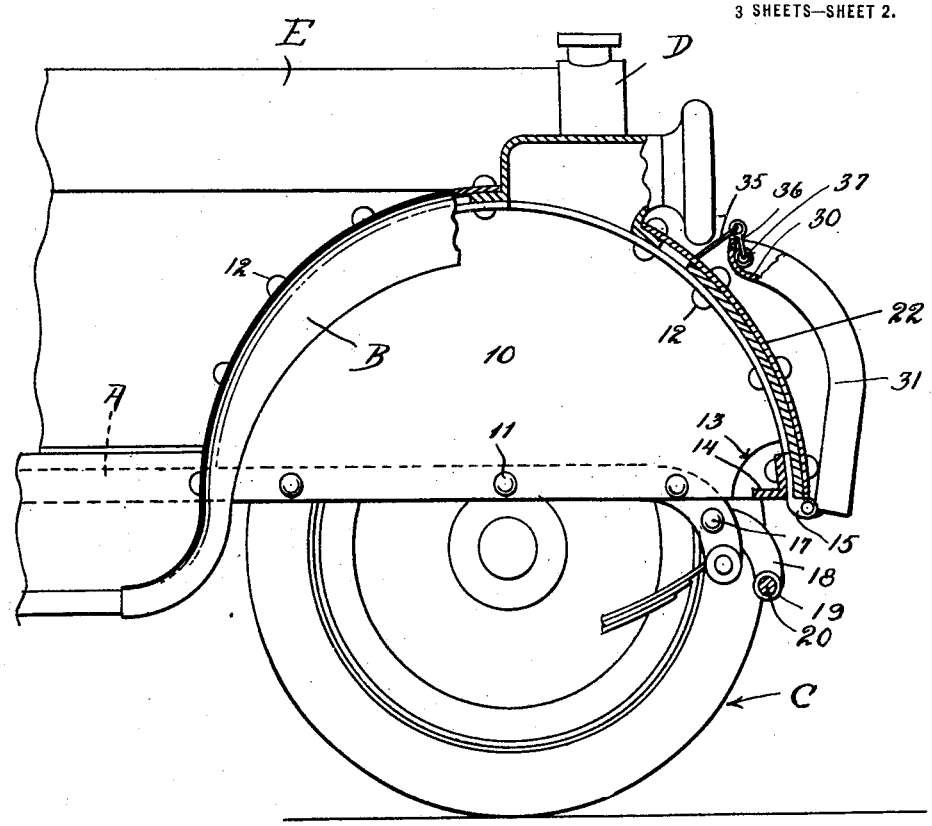
Figure 2 is a similar view showing the fender as swung into inoperative or elevated position, parts being broken away and in section to illustrate the construction more clearly.
Figure 7:
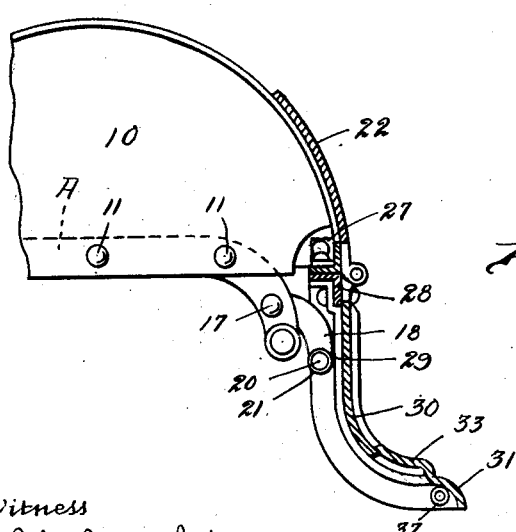
Figure 7 is a detail sectional view through the device showing it in operative position.

The movable portion of the fender comprises a horizontally disposed angle bar 28 to which are secured the upper ends of a pair of curved ribs 29 which may also be formed as angle bars suitably bent to shape and these ribs are so located as to be in front of the rubber sleeve covered rods 20. The frame formed by the angle bar 28 and ribs 29 is covered with sheet metal, indicated at 30, and the end portions of the apron or guard formed by this sheet-metal portion are secured to the lower leaves of the hinge members 15 so that this frame and its covering will be hingedly mounted with respect to the stationary portion above described, so as to be capable of disposition in a lowered position, as indicated in Figure 1, or in an elevated or inoperative position, as indicated in Figure 2. The edges of the metal plate portion 30 are preferably curved, as indicated at 31, whereby to improve the appearance and to eliminate sharp edges which might cause injury to a person struck by the fender. The intermediate portion of the sheet metal plate 30 is preferably pressed outwardly, as indicated at 32, as are the end portions 33, while the intermediate portions 34 are depressed, this specific formation tending to strengthen or stiffen the movable portion of the fender.

Ordinarily, that is when the fender is in operative position and in use, the movable portion is swung downwardly, as shown in Figure 1, and extends comparatively close to the ground so as to be in the proper position for scooping up a pedestrian struck by the vehicle so as to prevent the pedestrian from being run over by the wheels. When, however, the use of the fender is either not desired or is inadvisable on account of extreme roughness of a road traveled over, the movable portion may be swung upwardly into the position shown in Figure 2 and held in such position by means of a flexible member 35 suitably connected with the stationary portion of the device and carrying a snap hook 36 engageable with an eye bolt 37 secured at the lower edge of the movable portion. In case of a minor collision, the movable portion of the fender, or rather the ribs 29 thereof, will strike against the rubber sleeve covered rods 20 which will serve to cushion the shock and consequently lessen the liability of breaking or otherwise injuring the fender structure.

Though it forms no part of the fender structure, I prefer to provide sheet metal lamp casings 38 which are shaped as shown and which are secured upon the mud guards B, these lamp casings constituting the shells of the head lights of the vehicle, their disposition at this particular location being desirable in view of the fact that the curved plate 22 extends upwardly to such a point as to naturally obstruct the head lights if they should be mounted at the usual location between the radiator and the mud guards.

If desired, the hinged section of the fender might be formed in a more angular shape than that disclosed in the drawing so as to provide a platform upon which a person might stand or upon which baggage might be disposed for convenience in transportation without discommoding the occupants of the vehicle by packing baggage in the tonneau.

From the foregoing description and a study of the drawings it will be apparent that I have thus provided a simply constructed and consequently inexpensive fender structure which may be easily installed upon an automobile and which will operate to protect pedestrians run into from being run over by the vehicle wheels, and which will also serve to prevent injury to the vehicle in case of a minor collision. Owing to the simplicity of the construction, it is apparent that there is nothing to get out of order and that the device should have a long life and satisfactorily perform all the functions for which it is intended.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, I claim:—

1. A safety fender for automobiles comprising the combination with the front mud guards, of a pair of shields secured thereto at the inner edges thereof and secured to the frame bars of the vehicle, a plate secured to and connecting said shields, and a member connected with the lower edge of said plate and extending to the outer edges of the guards.

2. A safety fender for automobiles comprising the combination with the front mud guards, of a pair of semicircular shields secured at their straight edges to the frame bars of the vehicle and having their curved edges secured to the inner edges of said guards, and a plate secured to and connecting said shields.

3. A safety fender for automobiles comprising the combination with the front mud guards, of a pair of shields secured thereto at the inner edges thereof and secured to the frame bars of the vehicle, a plate secured to and connecting said shields, a member connected with the lower edge of said plate and extending to the outer edges of the guards, said member being hingedly mounted and being capable of upward swinging whereby to be disposed in inoperative position, and resilient buffer means located rearwardly of and engageable by said movable member.

4. A safety fender for automobiles comprising the combination with the front mud guards, of a pair of semicircular shield members secured to the inner edges thereof and to the frame bars of the vehicle, a horizontally disposed bar connecting said shield members, a plate secured to said shield members at the forward portions thereof, and a downwardly and forwardly curved movable member hingedly mounted upon said bar and including an upper horizontal bar and a series of ribs secured thereto, the last named bar and ribs having a sheet-metal element secured thereto, and means for holding said movable member in inoperative elevated position.

5. A safety fender for automobiles comprising the combination with the front mud guards, of a pair of semicircular shield members secured to the inner edges thereof and to the frame bars of the vehicle, a horizontally disposed bar connecting said shield members, a plate secured to said shield members at the forward portions thereof, and a downwardly and forwardly curved movable member hingedly mounted upon said bar and including an upper horizontal bar and a series of ribs secured thereto, the last named bar and ribs having a sheet metal element secured thereto, and means for holding said movable member in inoperative elevated position, forwardly curved depending arms carried by said shield members, and rubber sleeve covered rods associated with said arms and located rearwardly of said ribs for constituting a buffer.

6. A safety fender for automobiles comprising a pair of upstanding semi-circular partially bowl-shaped shields secured upon the top of the frame bars at the forward ends thereof and secured to the inner edges of the front mud guards, a horizontal bar secured to the lower forward corners of said shield, a transversely curved plate secured to and connecting said shields, a movable member formed as a curved sheet metal covered frame hinged upon said bar and disposable in selected positions, and means for holding said movable bar in inoperative position, the operative position being maintained by gravity.

7. A safety fender for automobiles comprising the combination with the front mud guards, of a pair of semicircular shields secured at their straight edges to the frame bars of the vehicle and having their curved edges secured to the inner edges of said guards, and a plate secured to and connecting said shields, said plate being curved in conformity with the curvature of the guards and having its side edges secured between the inner edges of said guards and said shields.

In testimony whereof I affix my signature.

THOMAS F. BUCK.